United States Patent [19]
Stoffels et al.

[11] 3,861,254
[45] Jan. 21, 1975

[54] SELF-LOADING ROLL SLITTER

[75] Inventors: Carl A. Stoffels, Flemington; Roger J. Lofstrom, Randolf Township, both of N.J.

[73] Assignee: Judelshon Industries, Inc.

[22] Filed: Mar. 4, 1974

[21] Appl. No.: 448,055

[52] U.S. Cl............................ 82/90, 82/2.5, 82/101, 82/102
[51] Int. Cl............................................... B23b 5/14
[58] Field of Search........... 82/102, 101, 90, 46, 48, 82/2.5

[56] References Cited
UNITED STATES PATENTS

| | | | |
|---|---|---|---|
| 2,020,113 | 11/1935 | Ferguson | 82/102 |
| 2,074,846 | 3/1937 | Judelshon | 82/90 |
| 3,174,369 | 3/1965 | Denk et al. | 82/101 |

*Primary Examiner*—Leonidas Vlachos
*Attorney, Agent, or Firm*—Amster & Rothstein

[57] ABSTRACT

A machine for slitting rolls of elongated material in which the support mechanism for the roll of material is movable from a loading position in which a roll of material is loaded onto the support mechanism to a cutting position at which the roll of material is supported and is rotated about its own axis as it is being slit. In the loading position, the roll of material mounted on a mandrel may be easily inserted into the support mechanism which then, using internal means within the machine, moves the roll from the loading to the cutting location.

9 Claims, 5 Drawing Figures

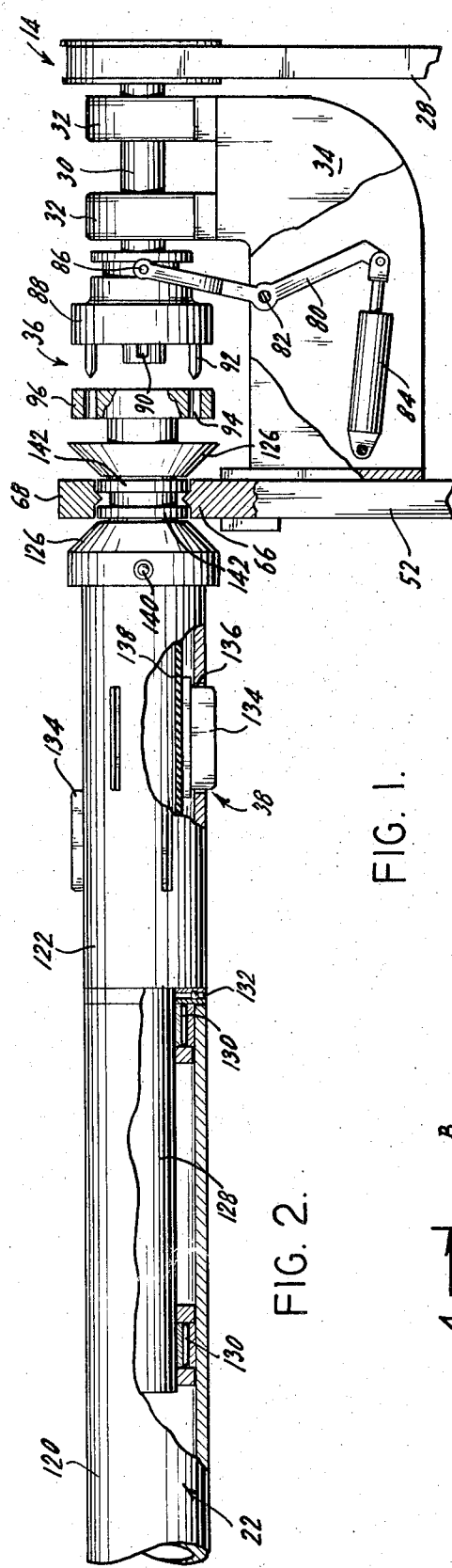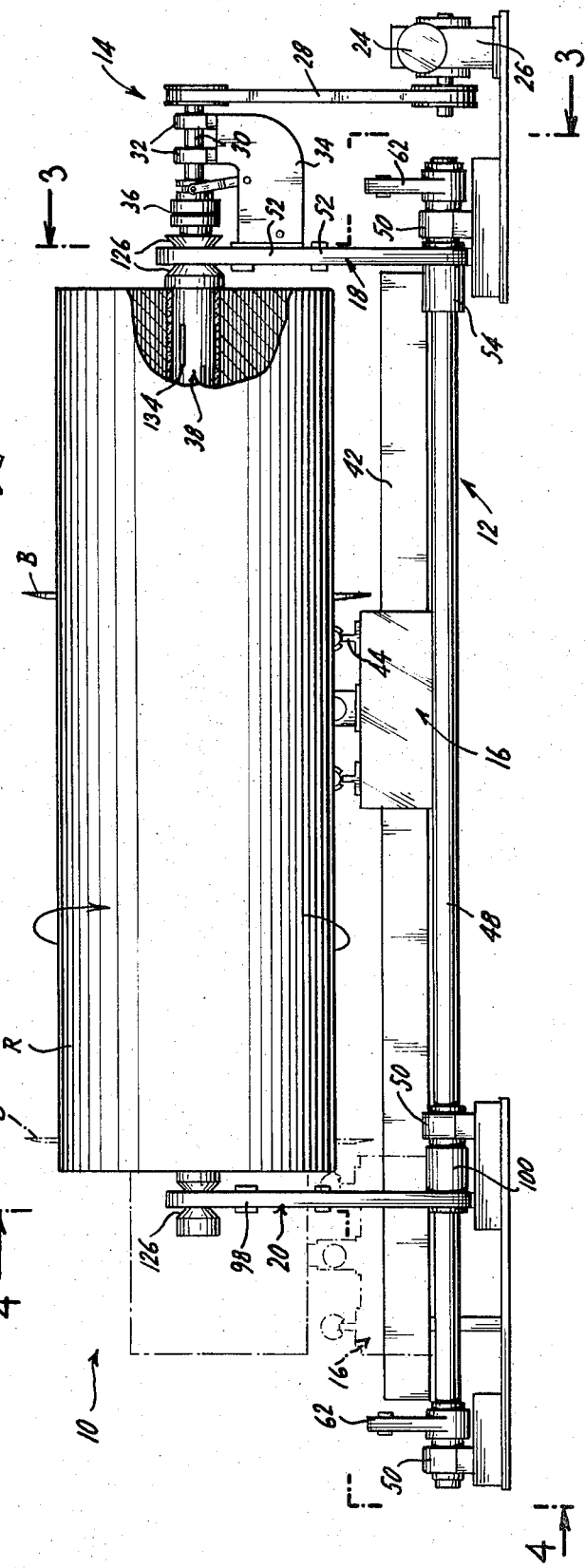
FIG. 1.
FIG. 2.

SELF-LOADING ROLL SLITTER

The present invention relates to machinery for use in the fabric and film manufacturing and handling industries and specifically, to an improvement in a roll slitting machine.

Roll slitting machines are well known and are used to cut large, wide width rolls of material (including woven fabrics, non-woven fabrics, plastic films, etc.) into rolls of smaller widths. These machines generally comprise a mechanism for mounting a stationary mandrel, means to engage and rotate the roll of material and its cardboard core about the mandrel and a circular cutting blade which is mounted on a carriage for movement along the length of the mandrel and for movement radially toward the mandrel. The circular blade is oriented in a plane perpendicular to the mandrel and is rotated about its own axis. As it moves radially into the roll, the roll is cut into narrower width pieces. Due to the size of the rolls of material and due to the high density of the materials which may be cut (for example, plastic film material), difficulty has been encountered in lifting the rolls of material into standard roll slitting machines. Specifically, a roll weighing thousands of pounds must be lifted to the level of a mandrel, threaded over the mandrel and accurately located and chucked along the axis of the machine. Performance of this task produces some difficulties or losses of time, or both.

Accordingly, it is a general object of the present invention to provide in a roll slitting machine, a mechanism to simplify the roll loading operation. Specifically, it is an object of the present invention to provide a roll loading or self-loading mechanism in a roll slitting machine to obviate the difficulties of roll loading which have been heretofore known.

It is a further object of the present invention to provide a mechanism in a roll slitting machine to allow a roll of material to be easily located at a loading location which typically is lower than the cutting location and then, by operation of the built-in mechanisms in the machine, to move that roll directly, positively and accurately to the roll cutting location.

In accordance with one illustrative embodiment of the present invention, there is provided an improved loading mechanism in a machine for slitting elongated cylindrical material. The machine generally includes a mandrel, drive means for rotating a portion of the mandrel, blade means mounted for movement radially of the mandrel to cut a roll of material on the mandrel, and carriage means for the blade means which is movable axially of the mandrel such that slitting operations can be conducted at various points along the width of material mounted in the machine. The improved loading means includes supporting means for supporting the mandrel and mounting means for mounting the supporting means from movement between a cutting position and a loading position. The mandrel in accordance with the present invention includes built-in chuck means for engaging the inside of a roll of material mounted on the mandrel. The mounting means, in an illustrative embodiment of the invention, comprise a pair of arms pivotally movable from a lowered mounting position to a raised cutting position such that the roll of material, mounted on its mandrel, may be moved along the floor and secured into the supporting means when in the loading position. The support arms are then elevated bringing the roll of material and its associated mandrel into the cutting position.

The above brief description, as well as further features, objects and advantages of the present invention, will be best understood by reference to the following detailed description of a presently preferred embodiment of the invention when taken in conjunction with the accompanying drawings, which are generally identified as follows:

FIG. 1 is an elevational view of a roll slitting machine manufactured in accordance with the present invention showing a roll of material mounted on a mandrel and the mandrel in place in the machine in the cutting position;

FIG. 2 is an enlarged partial elevational view, with portions broken-away for purposes of clarity, of the end of the mandrel which is provided with its integral internal chuck; FIG. 2 also shows the positive clutch drive mechanism incorporated in the present machine;

Figure 3:
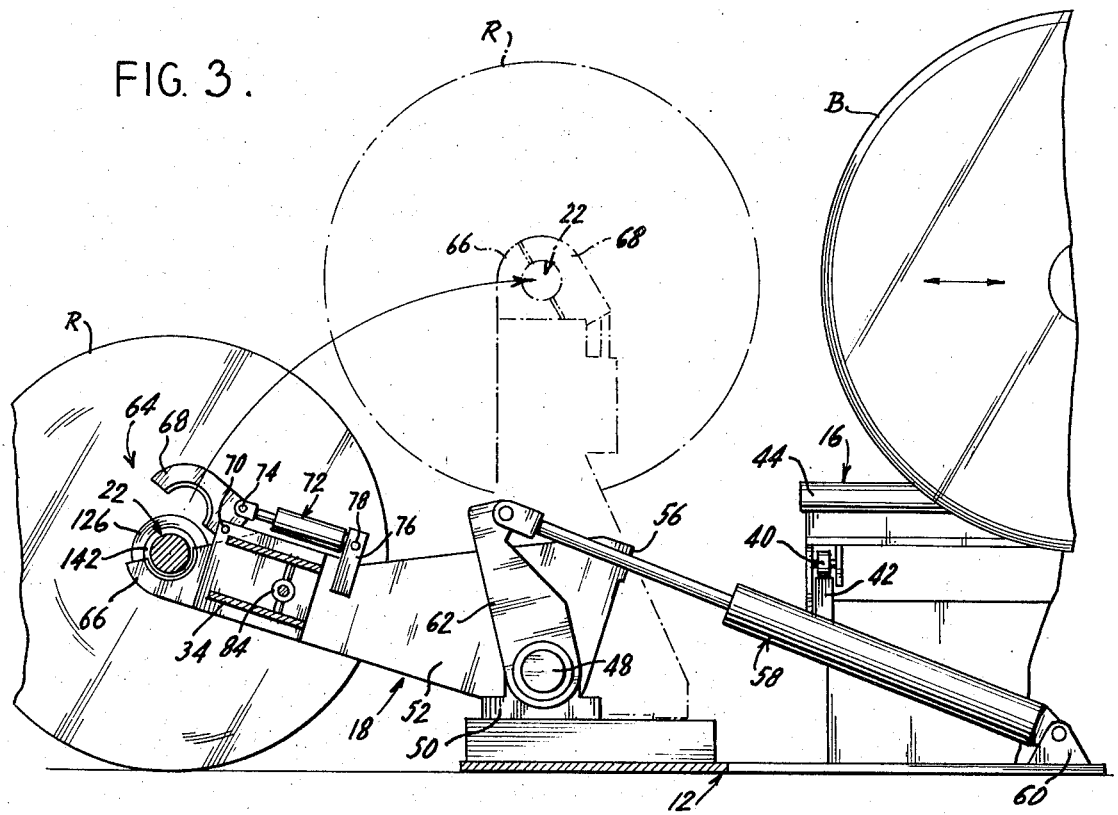
FIG. 3 is a sectional view taken along the line 3—3 of FIG. 1 looking in the direction of the arrows showing in full line the position of the mechanism in the loading position and in phantom lines in the cutting position.

Referring now to the drawings, and specifically to FIG. 1, there is shown a roll slitting machine in accordance with the present invention generally designated by the numeral 10. The machine generally consists of a frame 12 on which is mounted roll drive means 14, knife carriage means 16 and a roll loading and supporting mechanism 18, 20. The portion of the roll loading and supporting mechanism located at the driving or head end of the machine 10 is generally designated by the numeral 18, and the portion located at the other end or foot of the machine is generally designated by the numeral 20. A mandrel 22 is mounted within the loading mechanism 18, 20 and the roll of material on the mandrel is designated by the letter R.

For completeness, and by way of background information, a brief description of the operations of the normal cutting processes of the machine will be given. The roll R mounted on the mandrel 22 is driven for rotation about its own axis by the roll drive means 14 which includes the motor 24, the gear reduction unit 26 and the pulleys and belt 28 which are connected to the drive shaft 30. The drive shaft 30 is mounted in bearings 32 which are supported on the drive mounting arm 34 and a positive engagement clutch 36 completes the connection of the drive mechanism 14 to the mandrel 22. In a manner which will be described in detail below, an air chuck 38 is formed in one end of the mandrel 22 and forms a positive connection between that end of the mandrel and a roll of material R.

Continuing with the background description, the carriage 16 is mounted by appropriate internal wheels 40 on tracks or ways 42 for movement parallel to the axis of the machine 10. A blade B, with its appropriate drive mechanism, is mounted for movement in the perpendicular direction on the transverse tracks 44.

In the cutting operation, the carriage 16 is movable from its extreme position as shown in phantom in FIG. 1 to an infinate number of intermediate positions as shown in full line in FIG. 1 to an extreme position at the right hand end of the machine (as viewed in FIG. 1). At each selected location, the rotating blade B is moved radially inward into the roll R in order to slit the material on the roll and, as is usually desired, to slit the core of material of the roll as well. Upon completion of the slitting operation in the prior art machines, the material is removed from the mandrel 22 for further use as desired and a new roll of material R is placed on the mandrel for the purposes of slitting. In the present machine, a new, pre-loaded mandrel may be quickly and efficiently used to bring a new roll R of material to be cut with very little lost machine time and with very efficient use of labor.

A description will now be made of the loading mechanism 18 and 20 which is used to lift a mandrel 22, with a roll R upon it, from a loading position into the cutting position. The loading mechanism 18, 20 is mounted in the frame 12 on a mounting shaft 48 which is positioned in appropriate heavy duty bearings 50. Reference should be made to FIG. 3 for the following description of the loading mechanism 18 at the roll drive or head end of the machine. Mounting arm 52 is fixed, by means of its appropriate mounting collar 54 to the shaft 48 and rotates from the loading position, as shown in full line in FIG. 3 to the cutting position as shown in phantom in FIG. 3. The exact location of the cutting location is determined by a locating surface 56 which engages the base of the frame 12, and an appropriate adjustment may be provided. The mounting shaft 48 is driven between the loading and cutting positions by a piston and cylinder assembly 58 which at one end is pivotally mounted at the piston and cylinder bracket 60 on the frame 12 and at the other end is mounted to a crank arm 62. The crank arm 62 is fixed to the mounting shaft 48 and upon movement of that crank arm under the influence of the piston and cylinder assembly 60, the shaft 48 rotates thus rotating the mounting arm 52. A corresponding drive is located at the other end of the shaft 48 so that both ends of the mandrel 22 are moved at the same time as will be described below.

The support and clamping mechanism 64 at the outward end of the arm 52 comprises a two-part element which captures and clamps an appropriately formed portion of the mandrel 22. Specifically, a first semi-circular clamping member 66 is formed on the end of mounting arm 52 and, as may be seen in the sectioned portion of FIG. 2, the clamping member 66 has a portion of its inside surface which is triangular and which mates with a complementary formed portion of the mandrel 22. The second semi-circular clamping member 68 has a similar configuration and when the two clamping members are brought together, they form a complete circle to encapsulate the appropriate portion of the mandrel 22. The second clamping member 68 is pivotally mounted on the arm 52 at pivot 70 and is movable between its clamped position (see phantom lines in FIG. 3) and its open position (see the full line position shown in FIG. 3) under influence of the piston and cylinder 72. The cylinder portion of the piston and cylinder assembly 72 is pivotally mounted to the second clamping member at pivot 74 and the piston is connected to an appropriate bracket 76 on the arm 52 at pivot 78.

As will be readily appreciated from considering FIG. 3, when a roll of material R on a mandrel 22 is moved along the floor, it may be simply rolled into the open support and clamping mechanism 64 by placing the appropriate portion of the mandrel within the first clamping member 66. The support and clamping mechanism 64 is then closed into its clamping position by actuation of the piston and cylinder assembly 72 which swings the second clamping member 68 into tight clamping arrangement around the mandrel 22. Upon energization of the self-loading piston and cylinder assembly 60, the crank arm 62 is rotated in a clockwise direction (in FIG. 3) which rotates the mounting arm 52 in a similar clockwise direction to lift the roll R and mandrel 22 from the loading position as shown in the solid lines in FIG. 3 to the cutting position as shown in the phantom lines in FIG. 3. A completely parallel operation is simultaneously occuring at the other end of the roll R and mandrel 22 thus moving the roll R into position to be slit in accordance with the normal operations of a conventional slitting machine.

Figure 5:
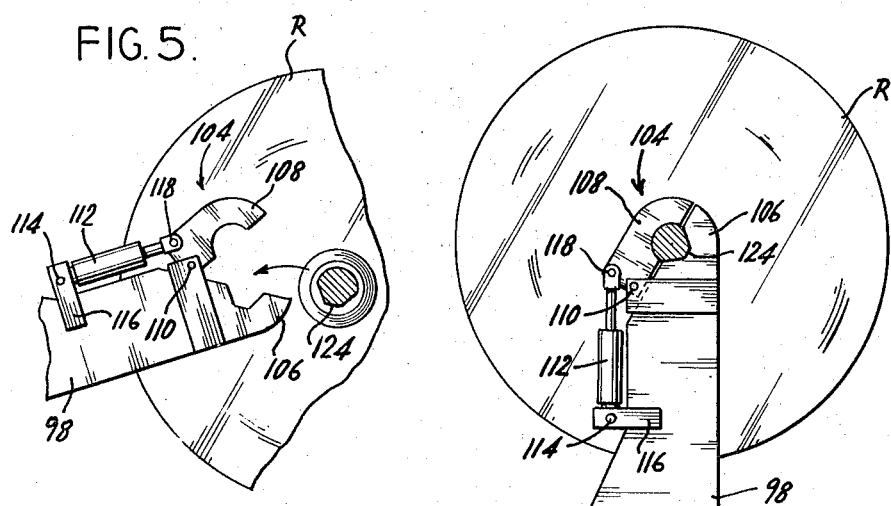
FIG. 5 is a partial view of the supporting means for the mandrel at the stationary end of the mandrel.
Figure 4:
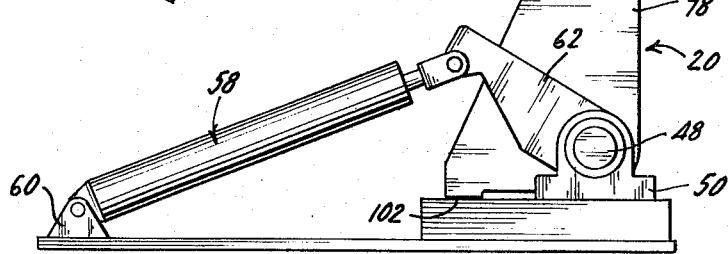
FIG. 4 is a sectional view taken along the line 4—4 of FIG. 1 looking in the direction of the arrows illustrating the configuration of the mounting and supporting means at the end of the machine in which the mandrel is stationary with the movable elements shown in the cutting position.

Referring now to FIGS. 4 and 5, a description will be made of the loading mechanism 20 at the end of the machine 10 removed from the roll drive mechanism. A mounting arm 98, generally of a shape complementary to the mounting arm 52 is fixed by its mounting collar 100 on the mounting shaft 48 for movement from the loading to the cutting position. A locating surface 102 is formed on the arm 98 to positively locate the position of the cutting location and an appropriate adjustment may be provided. At its radially outward end, the arm 98 is provided with a support and clamping mechanism 104 which comprises a geometrically shaped first jaw or first clamping member 106 and a circularly shaped second clamping member 108. The second member 108 is pivotally mounted at 110 and is driven by a piston and cylinder assembly 112 mounted on the arm 98 by pivot 114 on bracket 116 through its pivotal connection with the second clamping member 108 at pivot 118. The mandrel 22, as will be described in detail below, is formed with a three-sided geometric shape along 180° of its circumference at the appropriate point along its length to complement the clamping mechanism 104. In particular, the mandrel is formed to mate with clamping member 106, as may be seen in FIGS. 4 and 5 to define a rotational orientation for the mandrel 22. In a manner completely parallel to the situation which existed with regard to mounting arm 52, a second piston and cylinder assembly 58 is mounted on a second bracket 60 at the opposite end of the mounting shaft 48 and through a second crank arm 62, rotates the shaft 48 from the loading to the cutting position, thereby to move the entire loading mechanism from the loading to the cutting position. Of course, motion of the two piston and cylinder assemblies 58 is coordinated and two assemblies rather than one have been used in the machine 10 simply because of the substantial length of the shaft 48.

Reference will now be made to FIGS. 2 and 3 for some details of the roll drive mechanism which is found in the machine 10. The drive mounting arm 34 is mounted directly upon the mounting arm 52 such that the drive shaft 30 is maintained co-axial with the axis of the mandrel in the clamping mechanisms 64, 104. For purposes of coordination, the motor 24 and gear reduction unit 26 is mounted such that the output of the gear reduction unit 26 is substantially co-axial with the mounting shaft 48 such that when the arm 52 pivots between the loading and cutting positions, the arrangement of the drive mechanism 48 will accommodate that movement. The drive mounting arm 34 is constructed as a two-plate assembly (see FIGS. 1 and 3). The positive acting clutch 36 is operated through a bell crank lever 80 pivotally mounted at pin 82 on the mounting arm 34 and is energized by means of another piston and cylinder assembly 84 pivotally mounted on the arm 34 and to the bell crank lever 80. The other end of the bell crank lever is connected at 86 to the driving half 88 of the clutch 36. The driving half 88 of the clutch 86 is movable axially of the drive shaft 30 but is pinned to that shaft against relative rotational movement by means of an appropriate pin or lug in the slot 90. The clutch fingers 92 make positive connection with appropriate holes 94 in the driven portion 96 of the clutch 36. The driven portion 96 of the clutch 36 is fixed to the mandrel 22. When the piston and cylinder assembly 84 is energized, the bell crank lever 80 slides the driving half of the clutch 88 to the left (in FIG. 1) causing the clutch fingers 92 to engage within the openings 94, thus to interconnect the drive shaft 30 with the mandrel 38.

The mandrel 22 in the machine 10 in accordance with the present invention is adapted to serve both as a stationary supporting mandrel for the roll of material R as well as for providing a clutched drive interconnection between the roll R and the roll drive mechanisms. For this purpose, the mandrel 22 may be considered to be generally of two parts and for two distinct functions, the first part and function to be as a stationary mandrel and the second to be as a rotating air chuck. As can be seen in FIGS. 1 and 2, the mandrel 22 consists of a stationary portion 120 and a rotating air chuck portion 122. The stationary portion 120 is locked into its stationary position within the support and clamping mechanism 104 by means of the three-sided face 124 (see FIG. 5) which mates with the three-sided complementary shape formed into the clamping jaw member 106. Conical locating surfaces 126 are formed in the stationary portion 120 of the mandrel 22 and help position the mandrel 22 when it is being clamped into the loading mechanism 18, 20.

The interconnection between the air chuck portion 122 and the stationary portion 120 is illustrated in FIG. 2. An extension 128 of the air chuck portion projects co-axially within the stationary portion 120 and needle bearings 130 are appropriately mounted to form a rotating connection between the two portions. An appropriate thrust bearing 132 is provided between the two portions at their circumferential mating surfaces and provides a finished exterior surface.

The air chuck 122 is constructed with appropriate core-gripping fingers 134 which extend from within the air chuck 122 outwardly through openings 136. The fingers 134 are driven into their extending position by an air bladder 138 within the air chuck 122 and is inflated through an air valve 140. The chucking force is relieved by allowing air to bleed from the bladder 138 through the valve 140 and the mandrel 122 is threaded into the core of a roll R. Once in position, air is injected into the bladder 138 through the valve 140 thus pushing the fingers 134 to their outward position and clamping the chuck portion 122 to the core of a roll R such that rotation of the air chuck 122 will produce rotation of a roll R mounted thereon. Appropriate conical locating surfaces 126 are also formed on the air chuck portion 122, in a manner similar to that found at the other end of the mandrel, for axial location relative to the arm 52. However, since this end of the mandrel rotates, a pair of bearings 142 are positioned on the central body of the air chuck 122 and it is these bearings which engage the arm 52 and allow the remaining portion of the air chuck 122 to rotate relative to the rest of the machine.

A brief description of the overall operations of the machine 10 will now be given to increase understanding of the construction and functions of the machine. A conventional roll of material R, with a conventional core, is mounted on the machine mandrel 22. The air chuck portion of the mandrel is activated by applying pressure through the valve 140 thereby to tightly engage the chuck fingers 134 against the inside of the core. The roll R, carrying the mandrel 22 within it, is then easily moved to the machine by simple, generally available mechanisms. The loading mechanism 18, 20 is placed into its loading position with the arms 52, 98 in their lowered position and with the support and clamping mechanisms 54, 104 in their opened positions. The mating surfaces of the mandrel 22 is then moved into the open clamping members 66, 106, with the operator making sure that the three-sided face 124 of the stationary portion of the mandrel 120 is appropriately aligned with the three-sided face of the clamping member 106. This insures that the stationary portion of the mandrel will be in proper orientation such that the flat normally formed on the mandrel will be facing the blade B (in order to provide sufficient clearance for the blade B to cut into the core). The support and clamping mechanisms 54, 104 are then closed by energization of the piston and cylinder assemblies 72, 112. The piston and cylinder assemblies 58 are then energized to rotate the shaft 48 and tilt the arms 52, 98 into their upright positions, thus bringing the entire loading mechanism into the defined cutting position. The positive action clutch 36 is energized by activating the piston and cylinder 84 to bring the clutch fingers 92 into the openings 94. Conventional slitting operations are then commenced.

While cutting operations are proceeding in the machine 10, another mandrel 22 can be mounted in another roll of material R. When the cutting operations are completed, the positive action clutch is disengaged and the loading mechanism 18, 20 is lowered into the loading position from the cutting position. The support and clamping mechanisms 54, 104 are opened and the mandrel, with the roll R which has been slit into narrow widths, can then be removed.

The foregoing description relates to only the particular machine 10 and is intended to be merely illustrative of one presently preferred embodiment of the invention. Obviously, variations of lesser and greater extent can be made still incorporating the concepts of the invention.

What we claim is:

1. A machine for slitting a roll of material which includes a blade to radially penetrate into said material as said roll is rotated about axis, the improvement comprising:

a. a mandrel on which a roll of material to be cut is to be mounted;
   b. supporting means for supporting said mandrel in a cutting location adjacent to said cutting blade;

c. mounting means mounting said supporting means for movement between said cutting location and a loading location where said mandrel, with a roll of material thereon may be placed in said supporting means;

d. energizing means to move said mounting means and said support means carrying said mandrel between said load-position to said cutting position to transport a roll of material on said mandrel into position to be slit by said blade; and e. power means for rotating a roll of material on said mandrel and for rotating said blade.

2. A machine in accordance with claim 1 wherein said mandrel includes a chuck portion including means to grip a roll of material mounted thereon.

3. A machine in accordance with claim 2 wherein said mandrel includes a stationary part and wherein said chuck portion is rotated by said drive means to rotate a roll of material.

4. A machine in accordance with claim 3 wherein said power means includes de-clutchable connection means to said chuck portion of said mandrel.

5. A machine in accordance with claim 1 wherein said support means opens in the loading position for the removal and replacement of said mandrel therein.

6. A machine in accordance with claim 5 wherein said mandrel includes means for providing clearance means for said blade to cut through a core of a roll of material mounted on said mandrel and said mandrel and said supporting means including cooperative locating means to rotationally align said mandrel to said blade to position said clearance means relative to said blade.

7. A machine for slitting a roll of material into narrow width rolls including means to rotate a roll about a cutting axis, a blade mounted for movement parallel to said cutting axis and in a plane perpendicular to said cutting axis for slitting movement, a removable mandrel, supporting means for said removable mandrel, mounting means mounting said supporting means for movement between said cutting axis and a loading location, means to move said mounting means to said cutting axis to carry a roll of material to said cutting axis, chuck means to engage a roll of material on said mandrel, rotational drive means operatively connected to said chuck means to drive said roll of material for rotational movement about the cutting axis and means to move said blade in said perpendicular plane as said drive means rotates said chuck means about said cutting axis.

8. A machine in accordance with claim 7 wherein said chuck means are part of said removable mandrel and said drive means are removably connected to said chuck means.

9. A machine in accordance with claim 8 wherein said machine has a second removable mandrel the same as said defined removable mandrel such that one mandrel can be loaded and unloaded with material while the second mandrel is in said machine.

* * * * *